United States Patent
Molstad

(10) Patent No.: US 6,439,083 B1
(45) Date of Patent: Aug. 27, 2002

(54) UNIVERSAL SPRING TOOL

(75) Inventor: Dean R. Molstad, Sussex, WI (US)

(73) Assignee: dbm Innovation, Inc., Sussex, WI (US)

( * ) Notice: Subject to any disclaimer, the term of this patent is extended or adjusted under 35 U.S.C. 154(b) by 0 days.

(21) Appl. No.: 09/534,291

(22) Filed: Mar. 23, 2000

(51) Int. Cl.$^7$ ............................ B23B 29/24; G05G 1/04; G05G 5/06
(52) U.S. Cl. ...................... 74/813 L; 74/526; 74/527; 74/569; 417/388
(58) Field of Search .................................. 29/228; 74/526, 74/527, 813 R, 813 L, 569, 567; 417/388; 303/9.75

(56) References Cited

U.S. PATENT DOCUMENTS

| | | | |
|---|---|---|---|
| 3,748,716 A | * 7/1973 | Fidler | 29/228 |
| 3,757,561 A | 9/1973 | Rupert | 72/461 |
| 3,771,780 A | 11/1973 | Doocey | 269/153 |
| 3,830,347 A | * 8/1974 | Fader et al. | 188/322 |
| 3,997,033 A | * 12/1976 | Bulmer | 188/72.7 |
| 4,157,819 A | 6/1979 | Meyer | 269/231 |
| 4,289,049 A | * 9/1981 | Rebish | 81/56 |
| 4,352,003 A | 9/1982 | Arnoldt | 219/103 |
| 4,382,394 A | 5/1983 | Morin | 82/156 |
| 4,471,182 A | 9/1984 | Wieglos et al. | 200/83 |
| 4,504,038 A | * 3/1985 | King | 251/58 |
| 4,832,325 A | 5/1989 | Okolischan et al. | 296/305 |
| 4,837,411 A | 6/1989 | Best | 200/5 A |
| 5,114,334 A | 5/1992 | Boskovic | 425/556 |
| 5,252,010 A | 10/1993 | Obrecht et al. | 408/241 |
| 5,320,374 A | * 6/1994 | Farris et al. | 280/276 |
| 5,501,123 A | 3/1996 | Swann et al. | 74/822 |
| 5,526,715 A | 6/1996 | Swann et al. | 74/822 |
| 5,676,024 A | * 10/1997 | Yoshida et al. | 74/569 |
| 5,722,648 A | 3/1998 | Groll et al. | 269/47 |
| 5,735,514 A | 4/1998 | Moore, et al. | 269/43 |
| 6,213,566 B1 | * 4/2001 | Diaz | 303/9.75 |
| 6,264,436 B1 | * 7/2001 | Edwards et al. | 417/388 |
| 6,272,949 B1 | * 8/2001 | Jarvis et al. | 74/569 |

OTHER PUBLICATIONS

"Machine and Plant Floor News: Machine Tool Industry Will Experience Modest Growth in 200 and 2001", Manufacturing Automation, v7, n10, pNA, Sep. 1999.
Waurzyniak, P., "Workholding essentials", Manufacturing Engineering, v123 n1, pp. 72–78, Jul., 1999.
Koepfer, C., "Combination machines: changing the tool room", Modern Machine Shop, 72, 6, 98, Nov. 1999.
Jergens, Inc., "Jergens, Inc. Catalog", http://www.jergensinc.com, pp. 1–9, 1999.
Carr Lane Manufacturing Co., Product Catalog, pp. 56, 58–61, 63–67, 8/98.
All American Products Co., "All American Busing and Workholding Solutions", http://www.allamericanproducts.com, 1996.

* cited by examiner

Primary Examiner—Vinh T. Luong
(74) Attorney, Agent, or Firm—Boyle Fredrickson Newholm Stein & Gratz S.C.

(57) ABSTRACT

A tool or device is comprised of a generally cylindrical plunger that is retained in a generally cylindrical body. A spring fits inside the body to spring-load the plunger by means of a jam nut or other tensioning device. The plunger has tapped mounting holes with a pilot hole on the compression end for attaching various standard or custom components or attachments. The opposite tension end has a threaded extension also used for attaching devices. The body has a smooth outside diameter with at least one flat running the entire length. Due to the close fit of the plunger and body, the plunger has an axial groove on it upper surface to allow air inside the device to escape for smooth actuation. An optional splitclamp block is provided as a means of mounting. Also available as an option is a retracting lock.

23 Claims, 21 Drawing Sheets

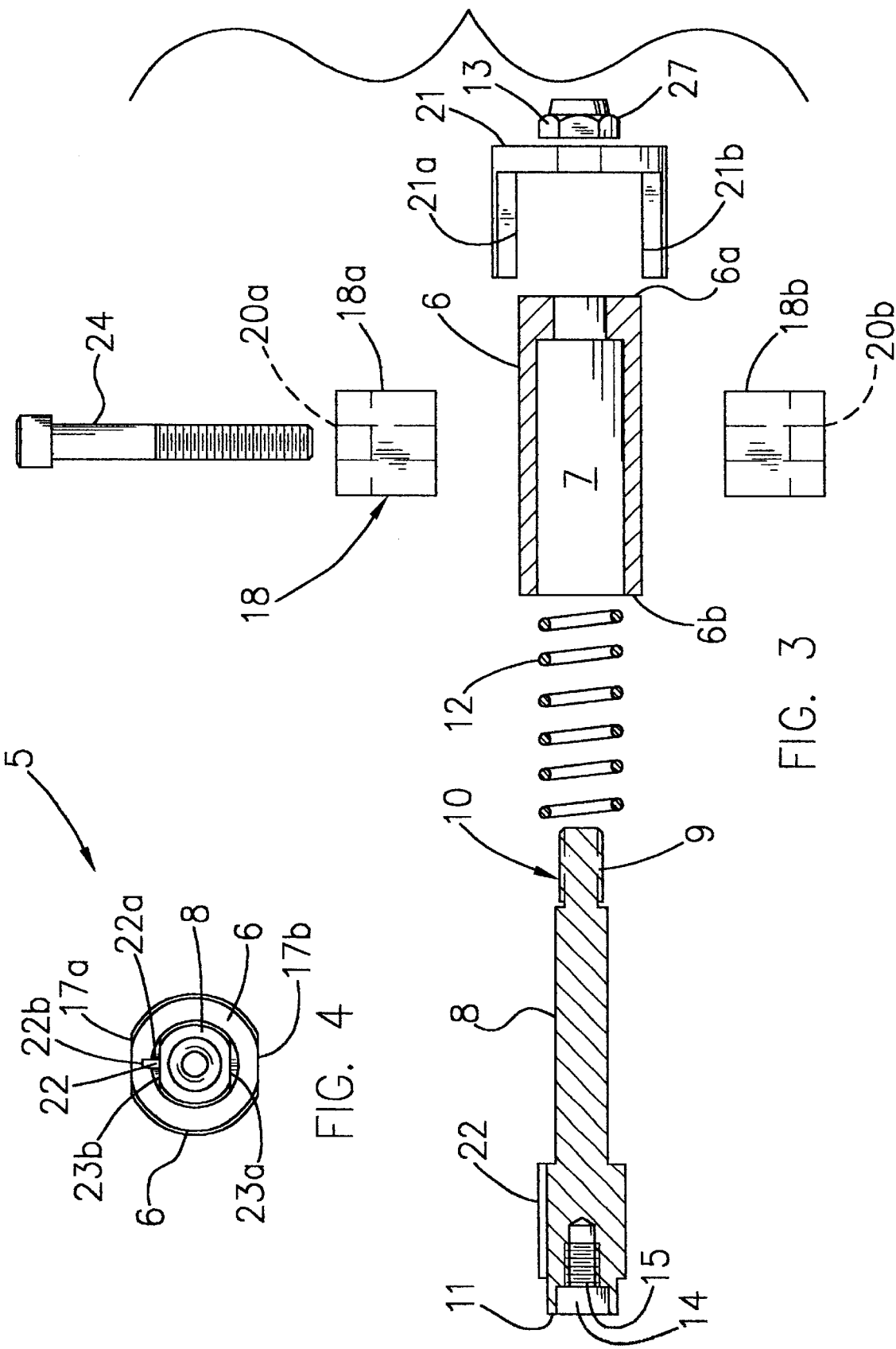

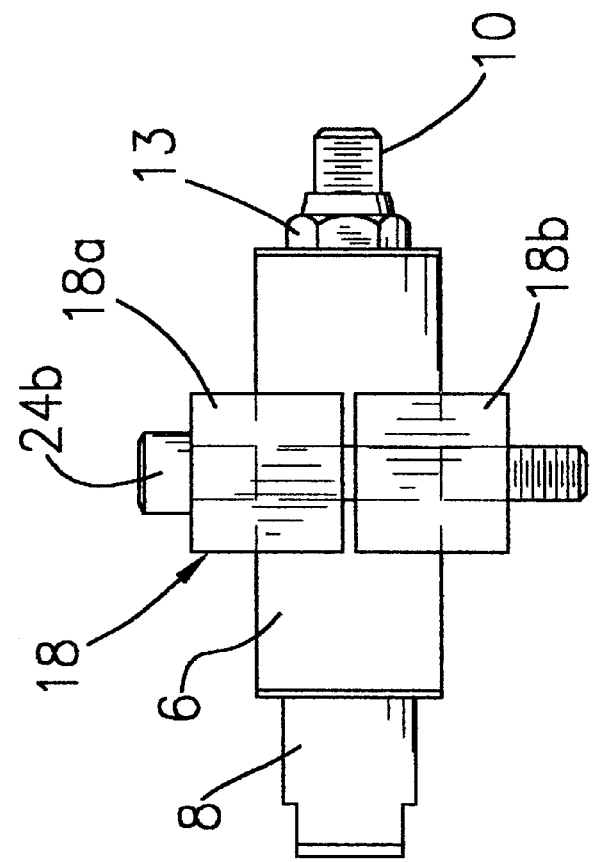
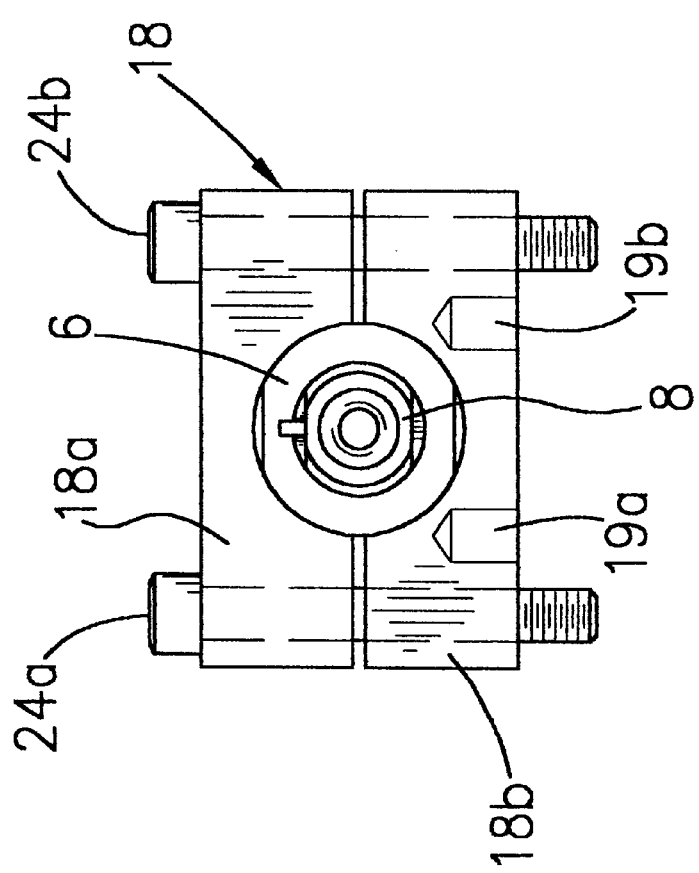

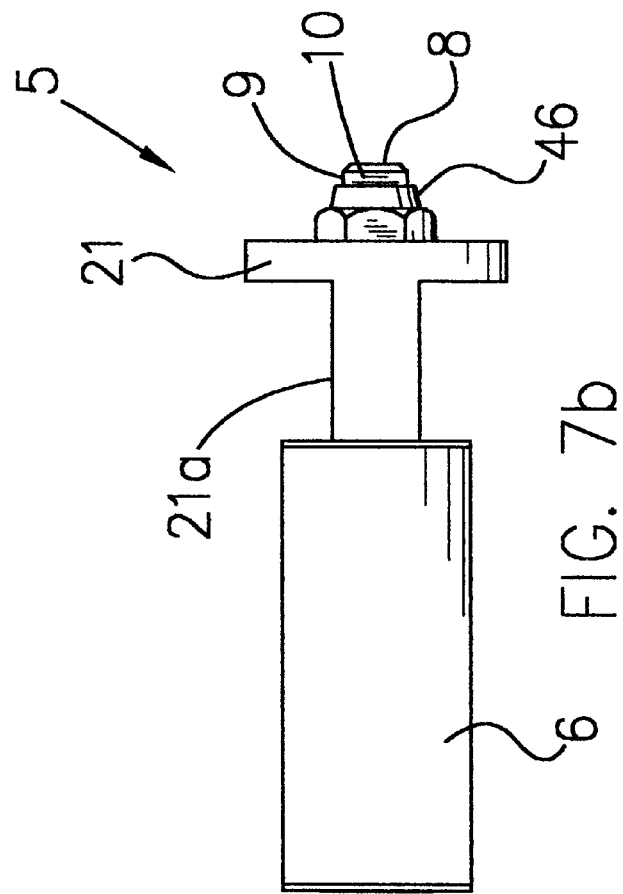
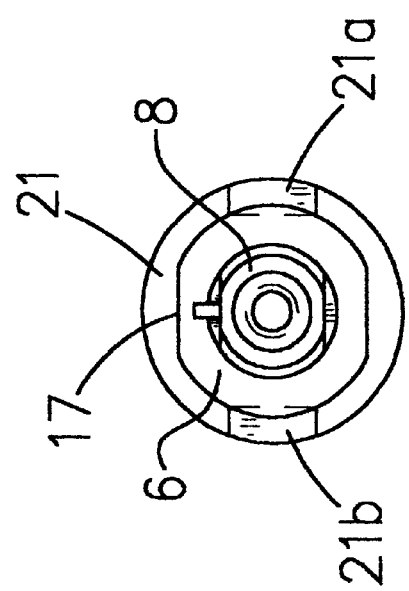
FIG. 7b
FIG. 7a

UNIVERSAL SPRING TOOL

BACKGROUND OF INVENTION

1. Field of the Invention

The present invention relates to machine components in general and in particular to a universal spring biased device having a plunger, which may receive a first and second attachment.

2. Discussion of the Related Art

Spring loaded machine components and tools are well known in the art. For example, various spring loaded fixturing components can be used as clamping mechanisms for various tool and machine applications. These conventional spring-loaded devices are individually designed for many different applications. This forces manufacturers, distributors or users to keep a large assortment on hand. Often a custom device must be designed and built because a standard device is not available with the correct features. Applications include, but are not limited to, holding, locating, stopping, braking, cushioning, indexing, latching, push or pull pins, and remote control applications.

Conventional spring loaded devices also generally have a hollow center for receiving a plunger. Typically, such conventional spring loaded devices have a single fixed attachment for a specialty function such as being received in a detent. However, what is needed is a spring-loaded device, which is useful for a wide universe of applications. What is also needed is a device that is easily adapted for many applications using standard or custom add-on components and attachments.

SUMMARY OF THE INVENTION

The spring-biased device of the present invention is comprised of a steel cylindrical body having an orifice. A hardened steel cylindrical plunger is received in the orifice and held in place by means of a jam nut or other device. The spring surrounds the plunger and is operably contained between the plunger and the body. The plunger has a first end or compression end and a second end or tension end. The first end has a hole therein for receiving a first attachment. The second end has threads for receiving a second attachment. A retracting lock maybe attached to the second end to engage the body and ensure that the plunger's movement is limited. The body is constructed of round stock and may have at least one flattened side. Preferably, the body has two flattened sides so that the body can be held steady with a conventional wrench during attachment and detachment or prevent interference with burrs caused by set screw mounting. Further, the flats engages tangs of the retractable lock to prevent movement.

A clamp is preferably associated with the body for attachment of the device to a mounting or support member. In one preferred embodiment a split clamp having an upper clamp portion and a lower clamp portion is used to form a mounting block for attachment of the body to the mounting member. At least one screw secures the clamp portions to each other and thereby restricts the movement of the body.

The plunger preferably has an axial groove. There may also be a groove in the body for receiving a key. A key may also fit into the axial groove to restrict the movement of the plunger. The plunger may also have preferably two flattened sides so that it can be held steady by a wrench during tightening. The hole at the plunger first end preferably has tapped threads to engage threads on the first attachment. The plunger second end preferably has an extension with threads along its length to engage the threads contained in the hole in the second attachment. The threaded hole of the second attachment and the threaded extension of the first attachment can receive a variety of attachments such as knobs, bolts, stopping members, gripping contact bolts, wheels, etc. Therefore, the tool may be used in both tension and compression applications.

The inventive tool may further be a precision spring-loaded cylinder of universal design for use in custom automation and fixturing applications. For example, unlike current spring stops and plungers, this tool may have tapped holes with a pilot hole on the end of the plunger for easy attachment of standard or custom details. A range of sizes is available to obtain the optimum spring force, and stroke and plunger diameter combinations for a multitude of applications. An optional retracting lock and a split-clamp-mounting block can also be provided. The device may be welded, bonded, or press fit into place on the mounting member.

Because the preferred body is made from round stock instead of the threaded body found on many conventional devices, the inaccuracies inherent with thread runout are avoided. The universal spring devices are made to close tolerances in order to handle accurate indexing applications as well as many other applications. Hardened steel plungers extend completely through the body, providing a large bearing surface for side and offset loading. Moreover, when used in typical spring stop applications, the body can be easily adjusted axially whereas conventional spring stops cannot.

In one preferred embodiment, the split clamp mounting block has at least one clearance hole for mounting the block to the mounting member. The preferred embodiment of the clamping block has holes for receiving screws, which may be tightened by a wrench. In another preferred embodiment, the clamp may have a hole for receiving at least one set screw to hold the clamp in place relative to the body.

At least one of the tension and/or compression end may be chamfered so that the end can be received in a receiving cavity. In another preferred embodiment, a pilot hole is used for centering the attachments and helping to locate the attachment into the hole in the end of the plunger.

The plunger lock can preferably be retracted and rotated 90° to lock the plunger in a retracted position. The retracting lock preferably attaches to the threaded extension at the tension end. The axial groove along the outer surface of the plunger allows air to escape from inside the body's orifice and thus allows for smooth, rapid plunger actuation.

Dowel pin holes allow the clamps to be mounted to pins contained in the mounting member. The inventive device may be a long stroke device or a short stroke device. Also, a light spring or a heavy spring may be used depending on the application. The spring may have a spring force between 0.5 and 71.25 foot pounds. Additionally, a snap ring, cable or jam nut may be included for tensioning the spring. The body is preferably machined from cold rolled steel. The steel body device preferably has black oxide finish and the plunger is preferably made of case hardened steel with a black oxide finish. However, any steel or aluminum may be used. In other preferred embodiments stainless steel or other forms of carbon steel may be used to improve wear resistance, corrosion resistance, and heat resistance. In some applications nylon, delrin or other forms of plastic maybe used so as not to mar soft materials such as aluminum or brass. In other applications, the device may be made of a phenolic or other fiber/resin material. Close tolerances may also be desirable.

One of the advantages of using the spring-loaded device of the present invention is that it allows for accurate and repeatable end forces. Further, it allows for side loading, its easier to install then conventional standard springs, the projection is repeatable time after time, the spring has a minimal compression set, the spring loaded component can be used in a variety of products, machine tools, fixtures, and assembly tools, and it can vary in size and weight as illustrated by the table below.

In yet another preferred embodiment, a sensor is attached to at least one of the compression end or the tension end. The sensor senses the plunger's movement.

In another embodiment, a remote actuating cable is attached to the tension end. The actuating cable moves the plunger relative to the body.

In still another embodiment, the invention may be used in a fixturing device in conjunction with a moving member.

Other applications include bumpers, stopping, indexing, latching, pull or push pinning, locating, holding, braking and other applications including remote applications.

These and other aspects of the present invention will be better appreciated and understood when considered in conjunction with the following description in the accompanying drawings. It should be understood however, that the following description, while indicating preferred embodiments of the present invention, is given by way of illustration and not of limitation. Many changes and modifications may be made within the scope of the present invention without departing from the spirit thereof, and the invention includes all modifications.

BRIEF DESCRIPTION OF THE DRAWINGS

The clear conception of the advantages and features constituting the present invention, and of the construction and operation of typical mechanisms provided with the present invention, will become more readily apparent by referring to the exemplary and therefore non-limiting, embodiments illustrated in the drawings accompanying and forming a part of this specification and wherein like reference numerals designate the same or like elements in several views and in which:

FIG. 3 is an exploded view of one embodiment of the present invention.

FIG. 4 is the front view of invention of FIG. 1.

FIG. 5a is a front view of another embodiment of the present invention;

FIG. 5b is a side view of the invention of FIG. 5a;

FIG. 7a is another front view of another embodiment of the present invention;

FIG. 7b is a side view of the invention shown in FIG. 7a;

DESCRIPTION OF PREFERRED EMBODIMENTS

Figure 1:
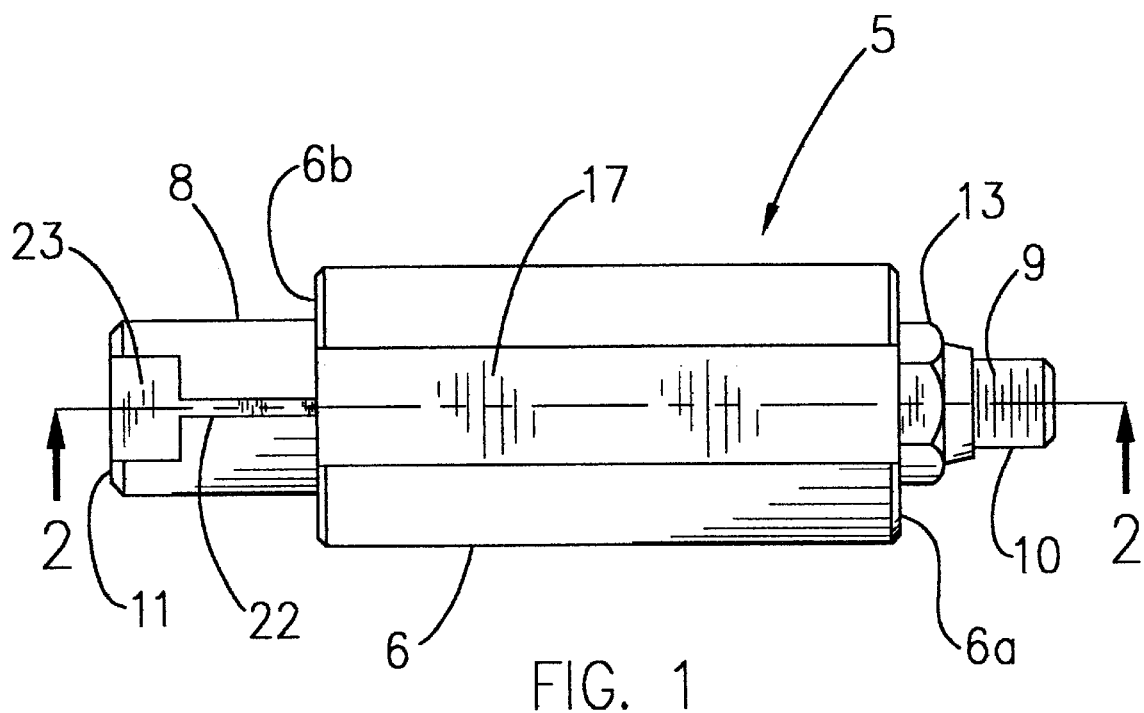
FIG. 1 is a top view of one embodiment of the present invention.

The present invention and the various features and advantageous details thereof are explained more fully with reference to the non-limiting embodiments described in detail in the following description. Referring more particularly to FIGS. 1–24, wherein like numbers refer to similar parts, the universal spring tool or device 5 for a machine of the present invention is comprised of a body 6 including the first body end 6a and the second body end 6b. As best seen in FIG. 3, an orifice 7 is contained in the body and preferably passes completely there through lengthwise.

Figure 2:
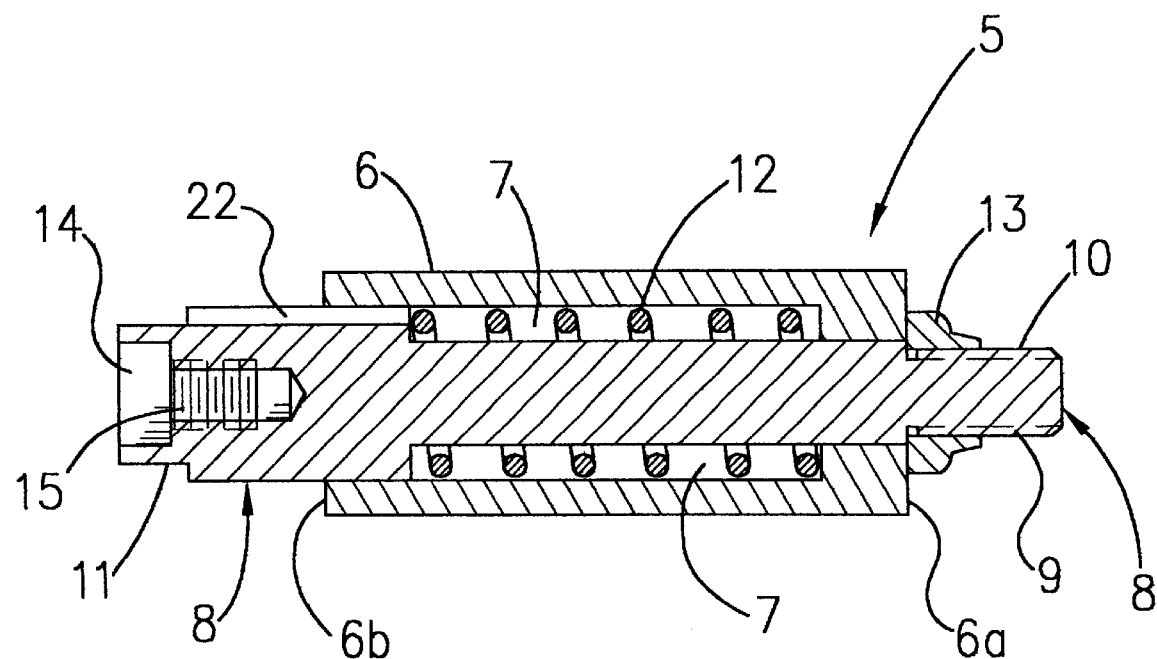
FIG. 2 cross sectional view the invention of FIG. 1.

Referring now to FIG. 1, the body 6 is preferably constructed of non-threaded, round, rolled steel stock. A plunger 8 is preferably operably associated with the body 6 and is received in the orifice 7 (FIG. 2). Plunger 8 includes a first plunger end or compression end 11 and a second plunger end or tension end 10. Compression end 11 preferably has a hole 15 therein. The second plunger end or tension end 10 preferably has a threaded extension 9. In one preferred embodiment as shown in FIG. 2 the first end 11 has a pilot hole 14 to ensure proper centering and location of a first attachment which is received by the hole 15. In one preferred embodiment the hole 15 has threads for receiving the first attachment 25 as best shown in FIG. 2. As shown in FIG. 2, the pilot hole 14 is slightly larger than the hole 15.

A biasing means or spring 12 is operably associated with the plunger and fits into the orifice 7 in the body 6. Spring 12 provides tension and compression to the plunger as best shown in FIG. 2. Referring again to FIG. 1, one preferred embodiment has a nut 13 with a threaded hole which acts to jam the end 10 against the body for creating a tension on spring 12 and thus restricts movement of the plunger 8.

Referring to FIG. 1, the body 6 preferably includes at least one flat side 17 for allowing the body to be held in place during tightening. In one preferred embodiment, the body 6 has two flat sides 17a and 17b so that a wrench can hold the body in place. Similarly, the plunger 8 has at least one flattened side 23 to accommodate a wrench during tightening. Axial groove 22 may also be part of the plunger 8. The axial groove 22 is used primarily to allow air to escape the orifice 7 when the plunger 8 is forced into the body 6.

FIG. 3 shows another embodiment of the present invention. In this exploded view the plunger 8 is shown exploded out of the orifice 7 of the body 6. The spring 12 is shown surrounding the plunger 8 and inserted into the orifice 7 of the body 6. Also shown is a clamp 18, preferably a split clamp mounting block, having an upper or first portion 18a and a second or lower portion 18b. Clamp contains holes 20a and 20b for receiving screws 24. The screws 24 hold the first portion of 18a and the second portion 18b of the clamp together tightly around the body 6 of the device 5.

FIG. 3 also shows retracting lock 21 which is also, generally cylindrical in shape and mounted between the first body end 6a and the jam nut 13 along the extension 9 of the plunger 8. Preferably, a pair of tang 21a and 21b project from lock 21.

FIG. 4 more clearly illustrates the flat sides 17a and 17b of the body 6 and the flat portions 23a and 23b of the plunger 8. In this embodiment, a key 22a is placed in the groove 22 of plunger 8 and groove 22b of the body 6 to prevent the plunger from moving radially.

FIGS. 5a and 5b show another embodiment of the device 5 of the present invention. Here the clamp 18 having first portion 18a and second portion 18b is held together with two screws 24a and 24b as shown. The clamp 18 squeezes the body 6 tightly as the screws 24a, 24b are tightened. The second portion 18b of the clamp 18 has dowel pin holes 19a and 19b to allow the clamp to be attached to a larger device such a machine.

Figure 6B:
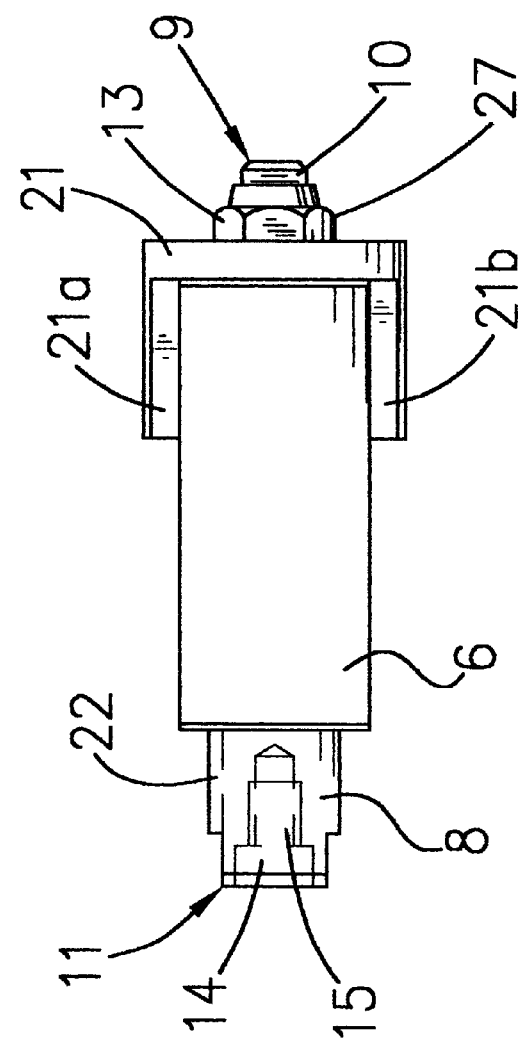
FIG. 6b is a side view of the invention of FIG. 3.
Figure 6A:
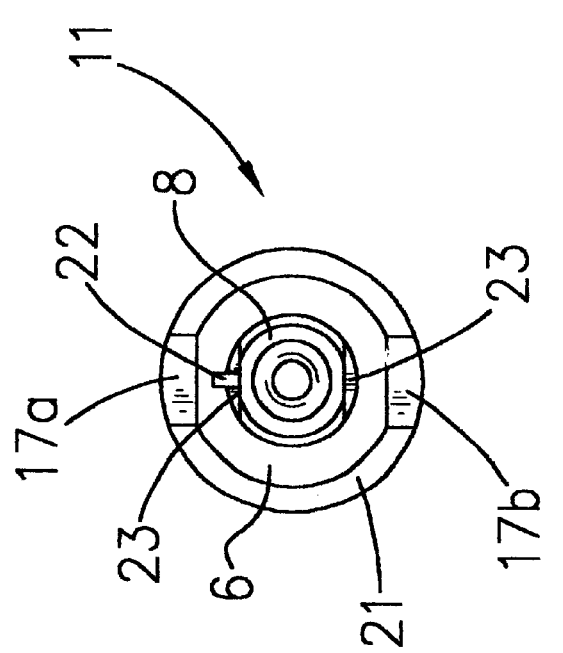
FIG. 6a is a front view of the invention shown in FIG. 3.

FIGS. 6a and 6b show the embodiment of FIG. 3 from both the front view (FIG. 6a) and a side view (FIG. 6b). As illustrated, tangs 21a and 21b projecting from the retracting lock 21 engage the flats 17 to limit movement of the plunger 8, for example, preventing the plunger 8 from rotating more than a few degrees in this embodiment. Extension of the plunger 8 may also be limited. FIGS. 7a and 7b show yet another embodiment of the machine component 5 with the lock 21 disengaged from the body 6. In this embodiment, the retracting lock 21 may be attached to the plunger 8. The tangs 21a and 21b are specially machined and dimensioned to engage the flats 17 of body 6. A snap ring 46 may engage the threaded extension 9 of the tension end 10.

Figure 8:
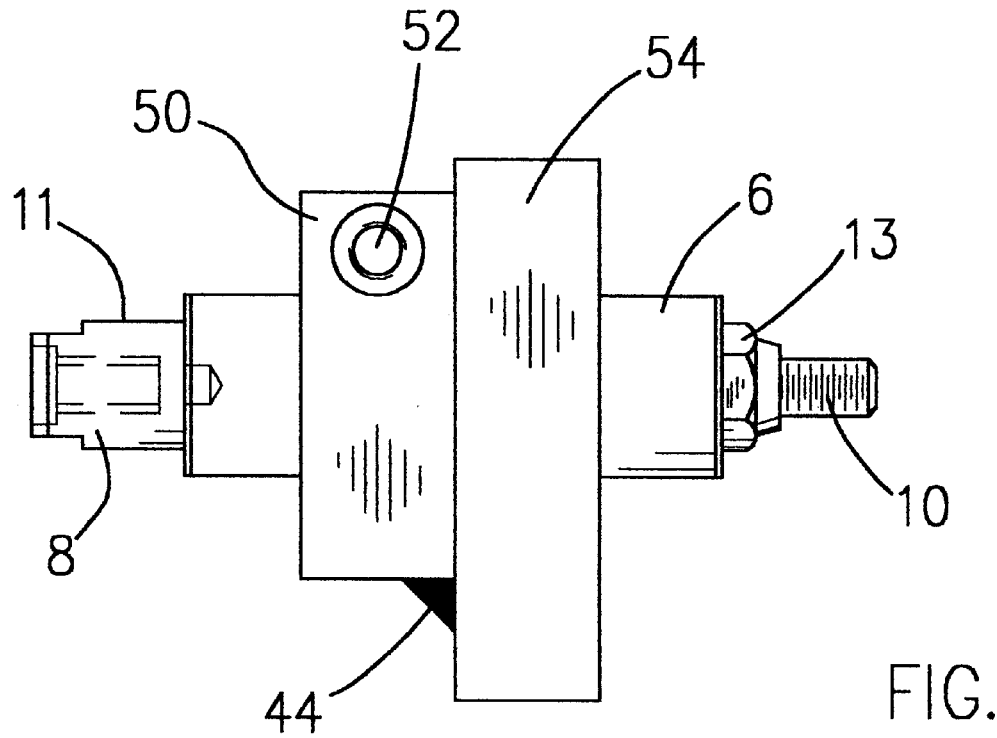
FIG. 8 is a side view of another embodiment of the present invention.

FIG. 8 shows another embodiment of the device 5 of the present invention. In this embodiment, the body 6 and the plunger 8 are secured to a supporting member 54. The clamp force is provided by a standard shaft collar 50, which is tightened by a bolt 52. Weld 44 connects the collar 50 to the member 54.

Figure 9:
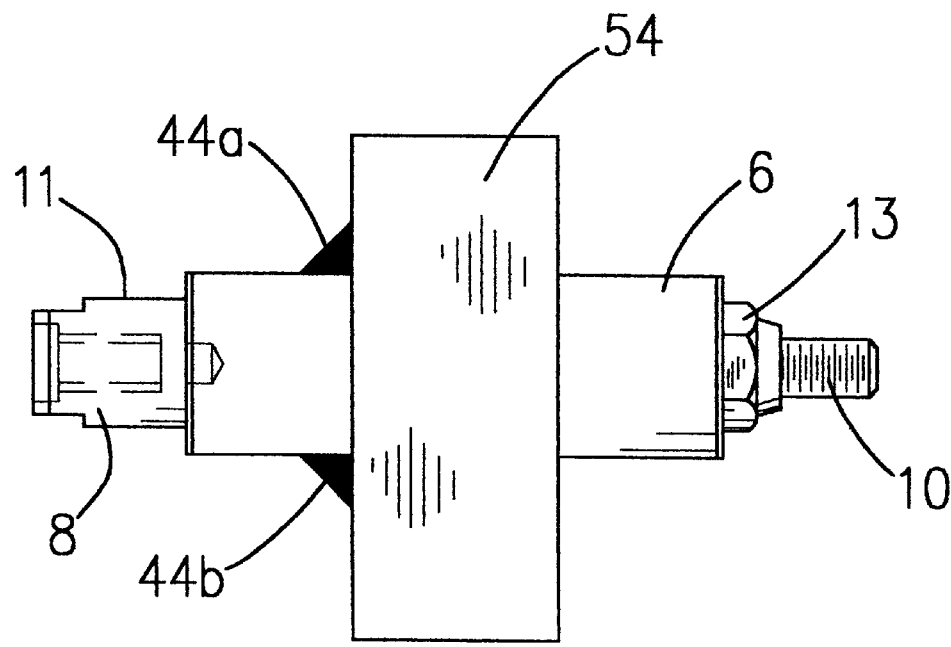
FIG. 9 is a side view of another embodiment of the present invention.

FIG. 9 shows an embodiment of the device 5 of the present invention wherein a body 6 is secured to a supporting member 54 by welds 44a and 44b.

Figure 10:
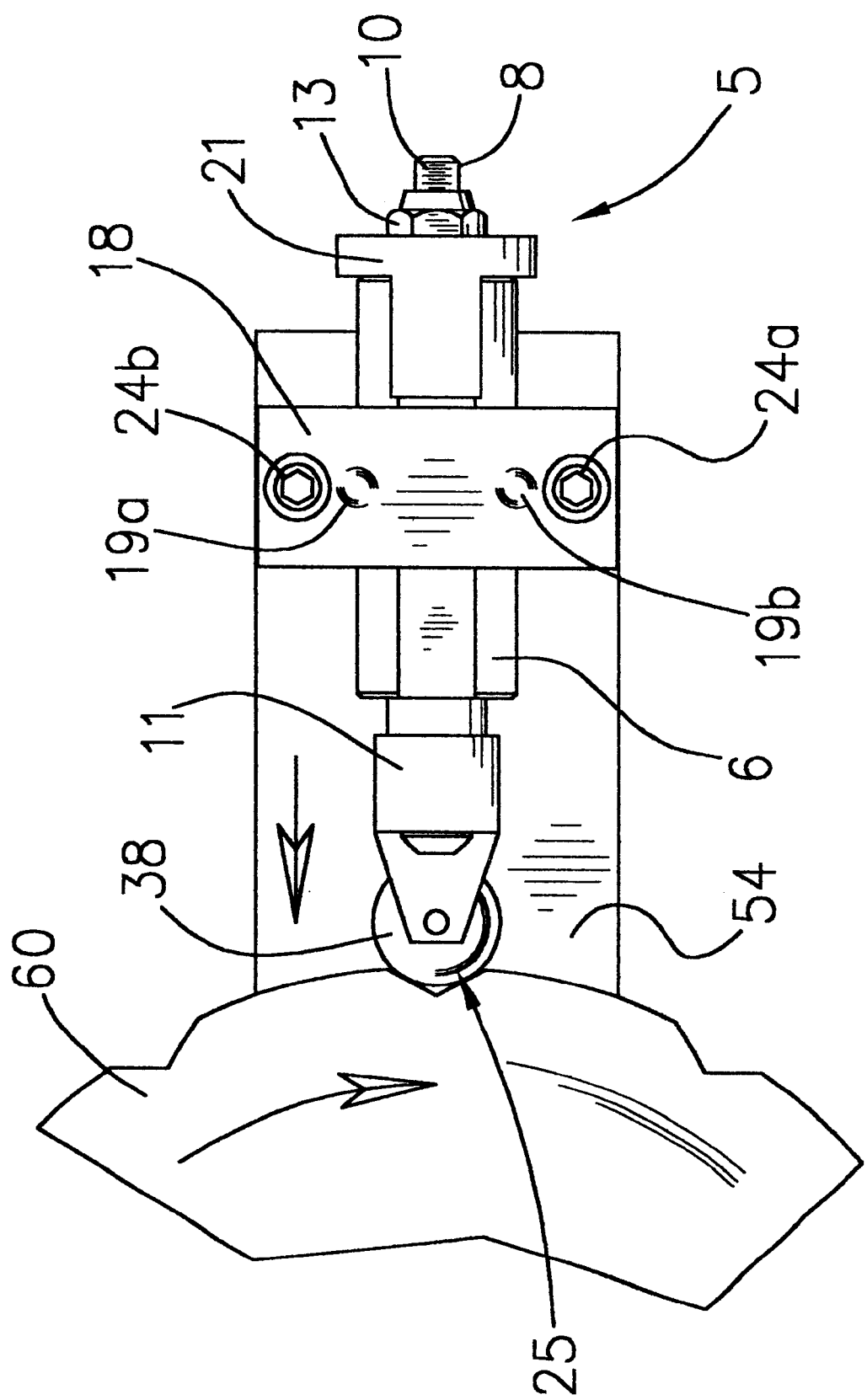
FIG. 10 is a top view of yet another embodiment of the present invention.

FIG. 10 shows device 5 of the present invention wherein the device is used for a roller detent application on a cam or wheel 60. Attached to the compression end 11 of the plunger 8 is a first attachment 25. The first attachment has a roller 38 attached to its outer most end. The device 5 is attached to a mounting or supporting member 54 by clamp 18 and dowel pins 19a and 19b. Body 6 is contained by the clamp portions 18a and 18b. At the tension end 10 is a retracting lock 21 which is secured by a jam nut 13 which engages the threaded extension 9 of the plunger 8. In this roller detent application the roller 38 allows the wheel 60 to advance in a controlled fashion as the device 5 asserts pressure on the roller 60. The retracting lock 21 used in this application acts as an anti-rotation device for the plunger 8 and first attachment 25.

Figure 11:
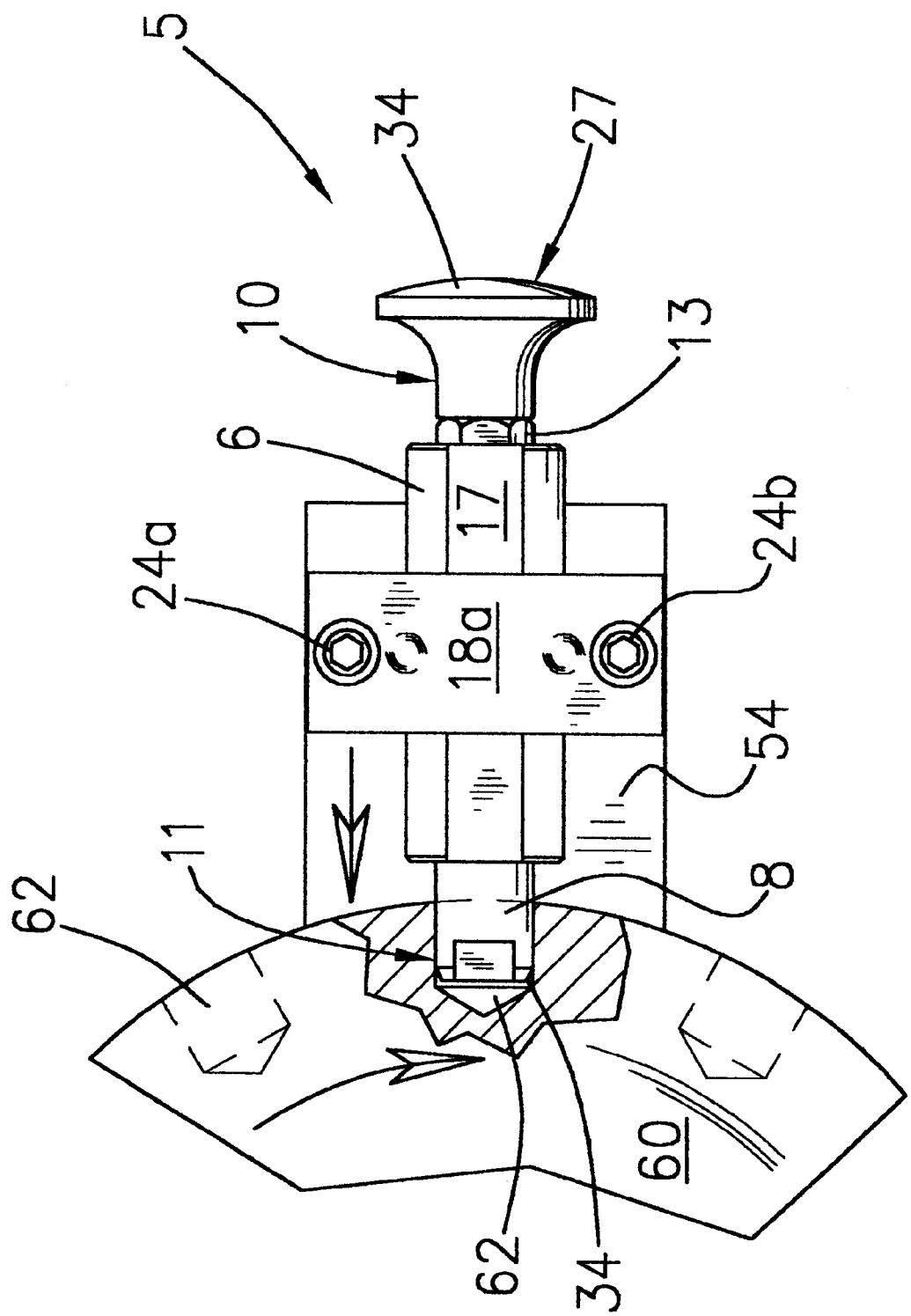
FIG. 11 is a top view of still another embodiment of the present invention.

FIG. 11 shows the device 5 being used in a indexing application with the wheel 60. Tension end 10 of the plunger 8 has a jam nut 13 and a second attachment 27. In one preferred embodiment, the attachment 27 is a knob 34 as shown. On the compression end 11, the chamfered edges 32 of the plunger 8 engage receiving cavity 62 located in the wheel 60 as the wheel 60 advances. Device 5 is attached to a mounting member 54 by a clamp 18. The clamp 18 may be secured to the mounting member 54 by screws 24a and 24b. Also shown is flat 17 which allows for the body 6 to be held in place during tightening by a wrench.

Figure 12:
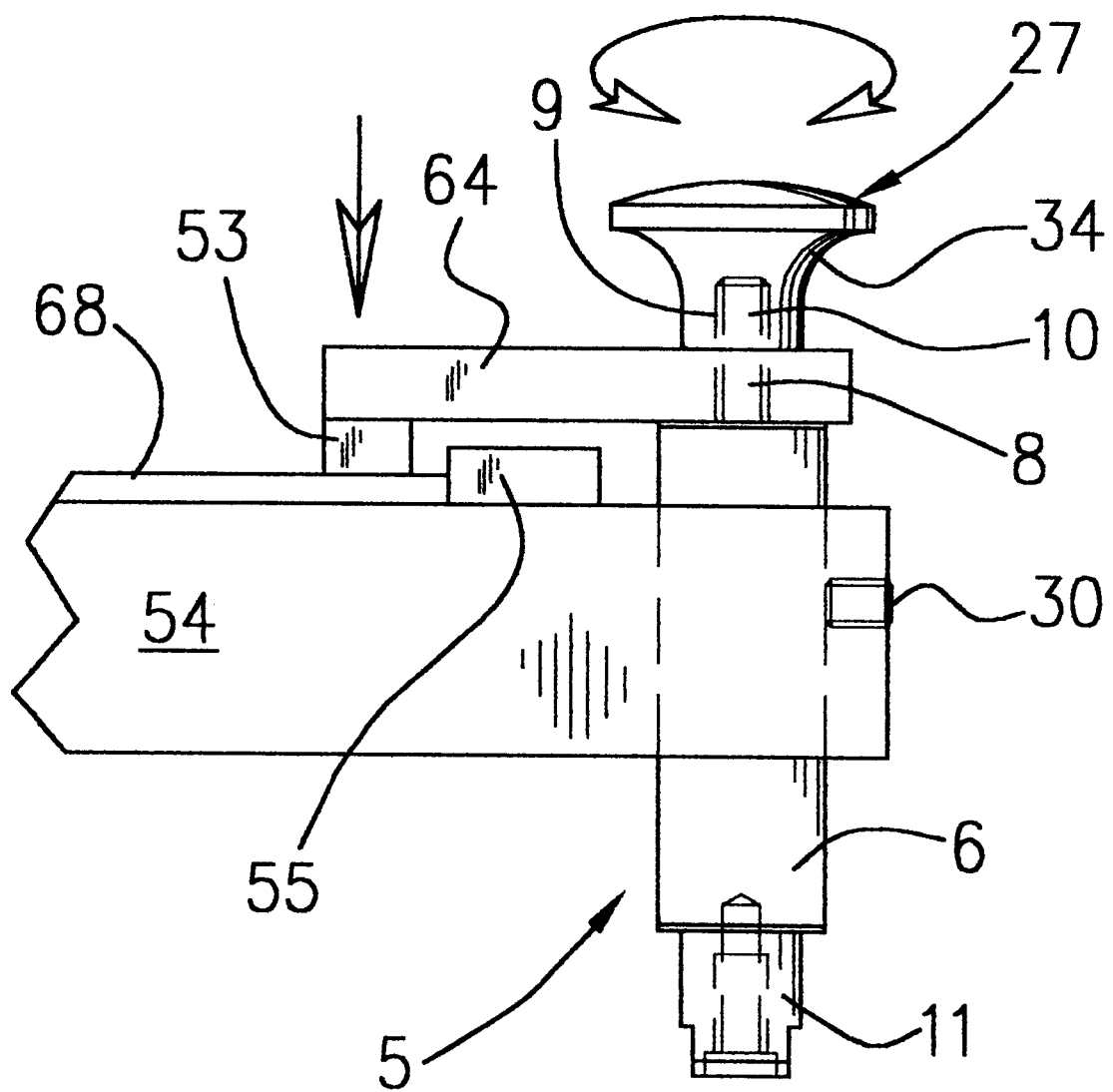
FIG. 12 is a side view of yet another embodiment of the present invention.

FIG. 12 shows the device 5 being used in a tension/rotation application. In this application, device 5 is attached to a clamping member 64 which has a hole for receiving the plunger 8. A clamping arm 53 applies tension forces to a workpiece 68, which comes into communication with locating stop 55. Stop 55 is mounted to support member 54. Threaded extension 9 of the plunger is attached to a second attachment 27. In this embodiment, the second attachment 27 is preferably a knob 34. Setscrew 30 holds device 5 in place.

Figure 13:
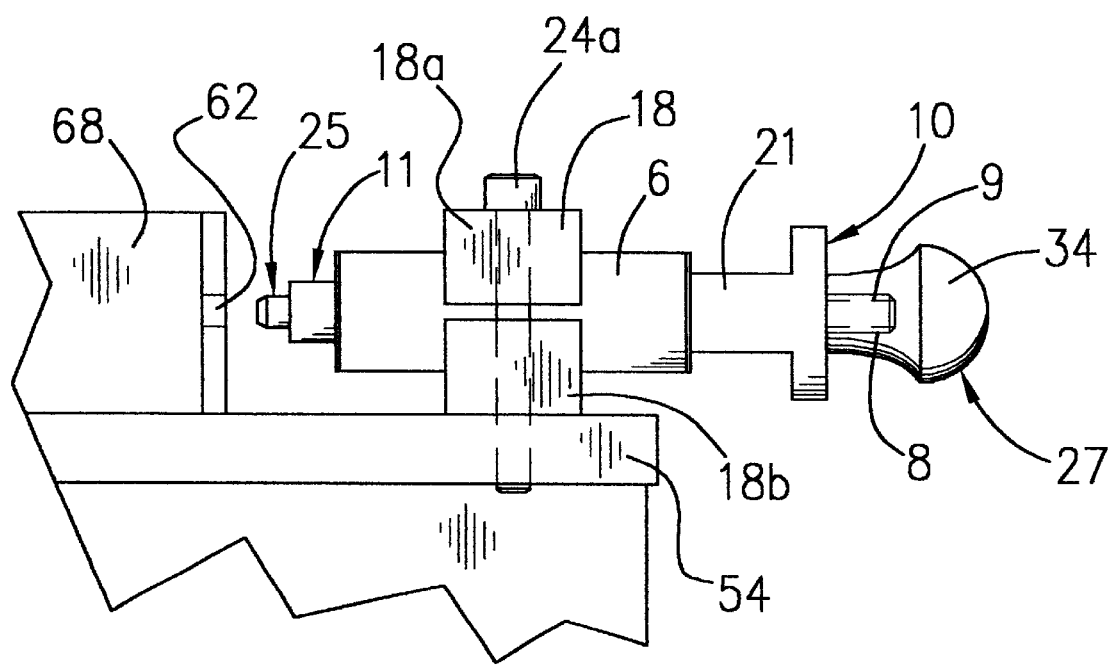
FIG. 13 is a side view of still another embodiment of the present invention.
Figure 14A:
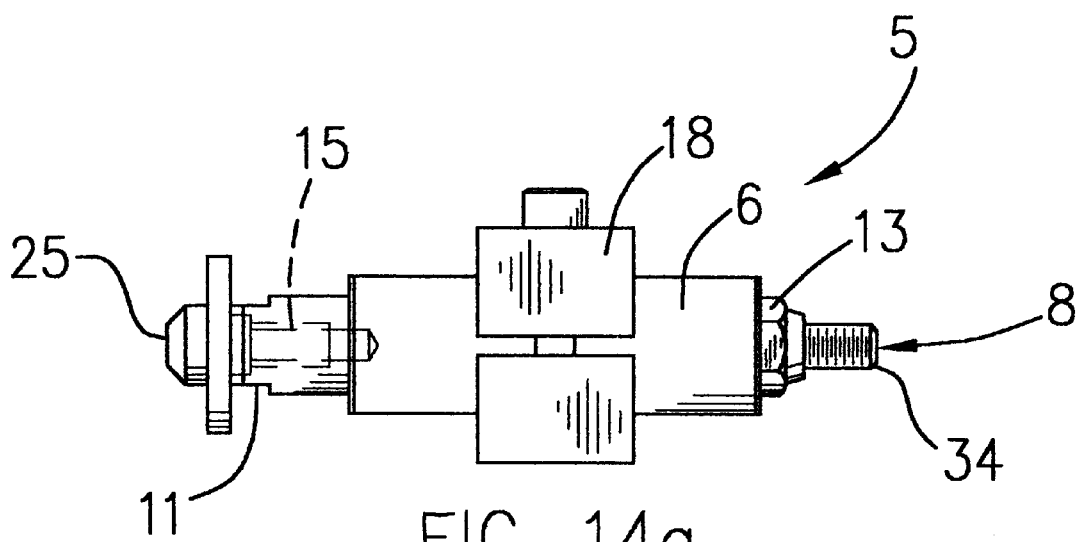
FIGS. 14a–c are side views of still another embodiment of the present invention.
Figure 14B:
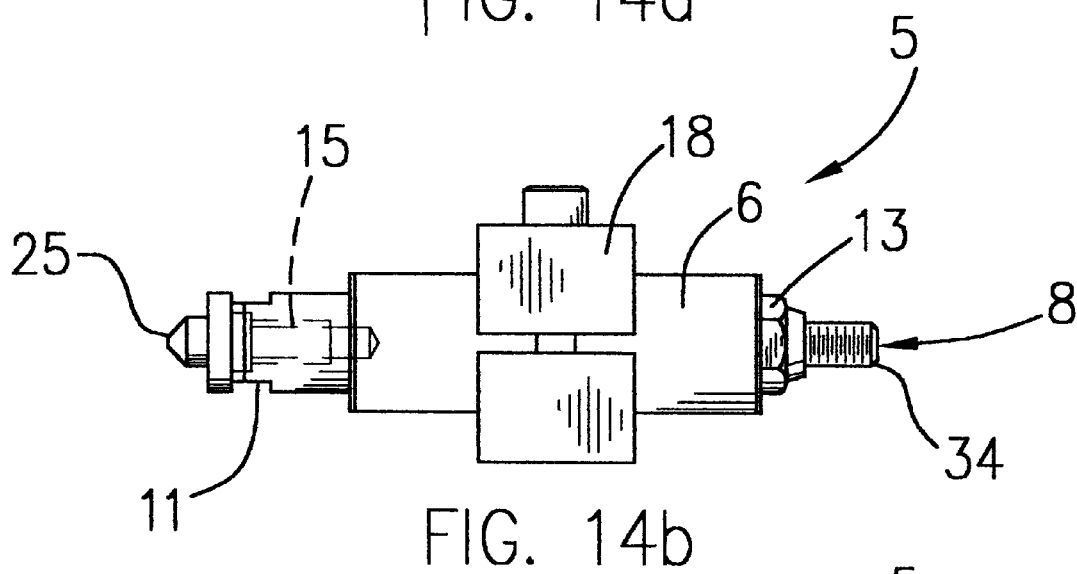
Figure 14C:
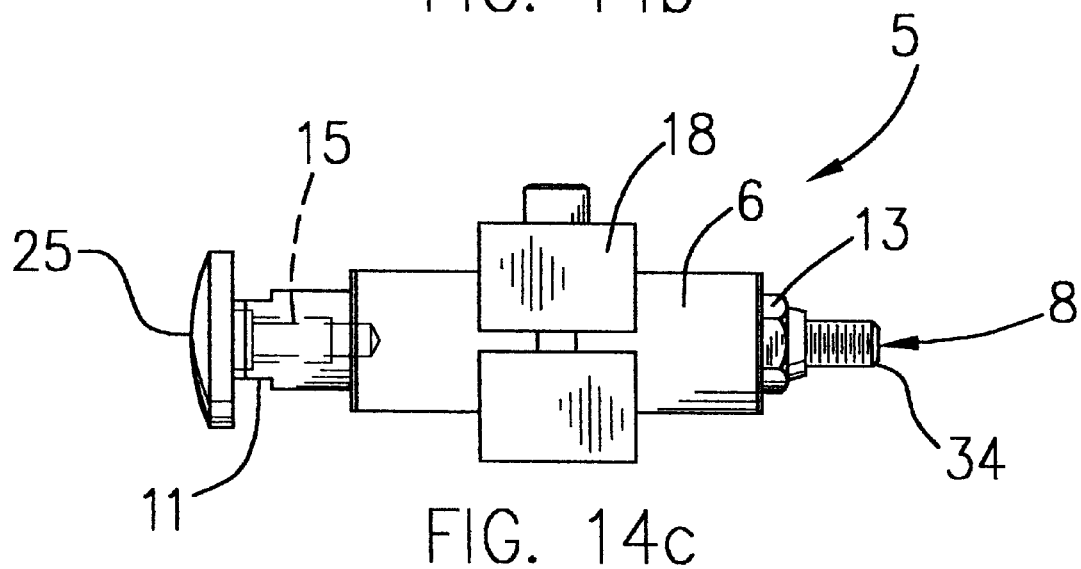

FIG. 13 shows the device 5 of the present invention being used in a pull and turn retracting lock application. In this embodiment, a first attachment 25, in this case a locating pin 35, engages a receiving cavity 62 as shown. The body 6 is again held in a clamp 18 having a first portion 18a and a second portion 18b. The first portion 18a and the second portion 18b of the clamp 18 are held together by screws 24a, 24b which secure the clamp to a machine mounting member 54. At tension end 10, retracting lock 21 and turning it 90° prevents locating pin 35 from engaging the cavity 62. Attached to the threaded extension is a second attachment 27. In this embodiment, the second attachment 27 is a knob having a rounded head 34. FIGS. 14a–14b show various machine components 5 of the present invention having first attachments 25 of various shapes and sizes. These attachments 25 can be customized depending on the type of application. Each of the attachments 25 are engaged in a hole 15 at the compression end 11 of the plunger 8 as shown in each of the FIGS. 14a, 14b and 14c.

Figure 15:
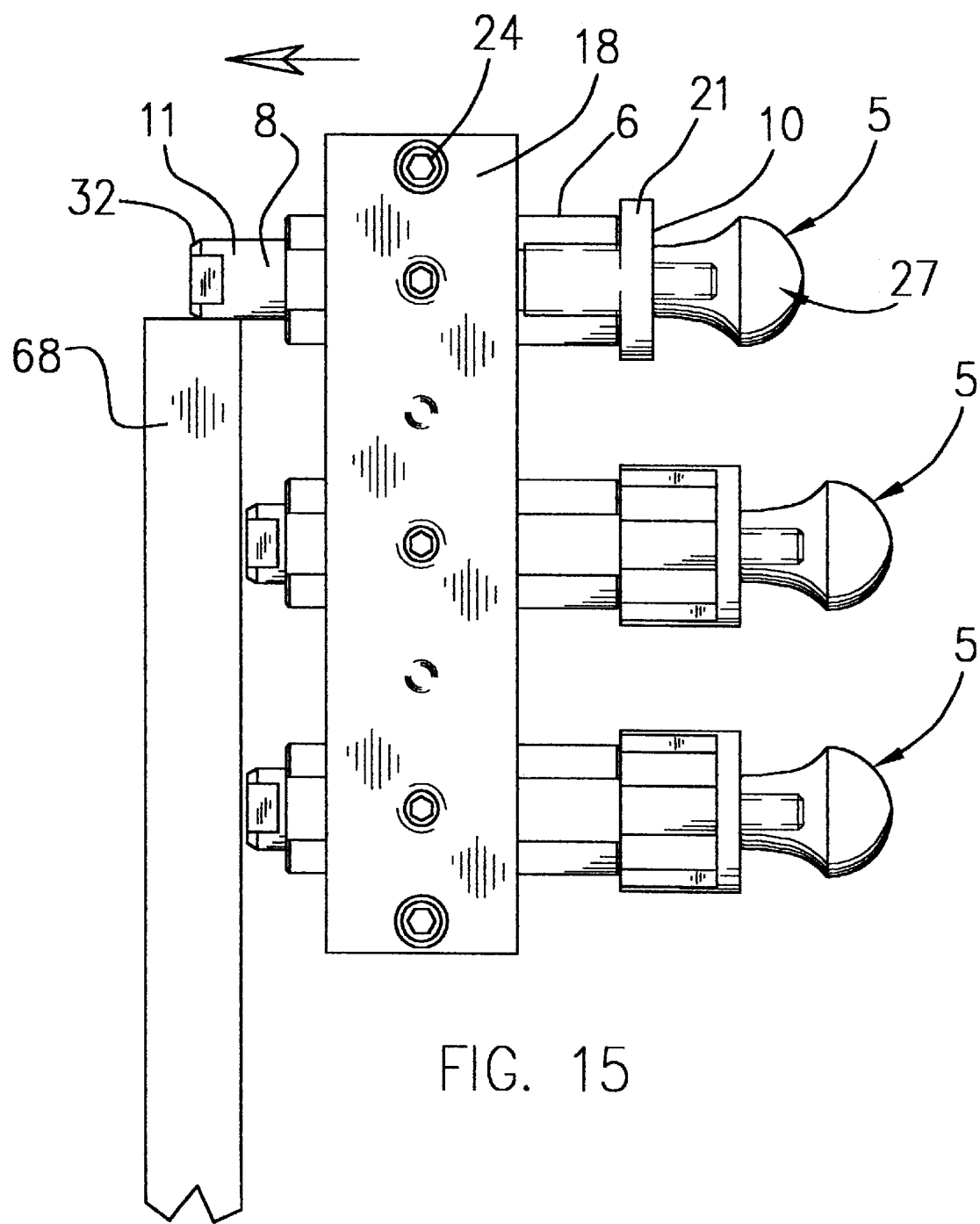
FIG. 15 is a top view of yet another embodiment of the present invention.

FIG. 15 shows the device 5 of the present invention wherein multiple devices 5 are used as stops in an application. The compression end 11 of the plunger 8 is shown engaging a target member or workpiece 68. The chamfered end 32 provides for less friction during the engagement. Opposite the compression end 11 is the tension end 10, which has attached to it a second attachment 27. A retracting lock 21 allows retracting the plunger 8 to select 3 different stop positions as required. The devices 5 are held in place by a single clamp 18, which is secured by screws 24.

Figure 16:
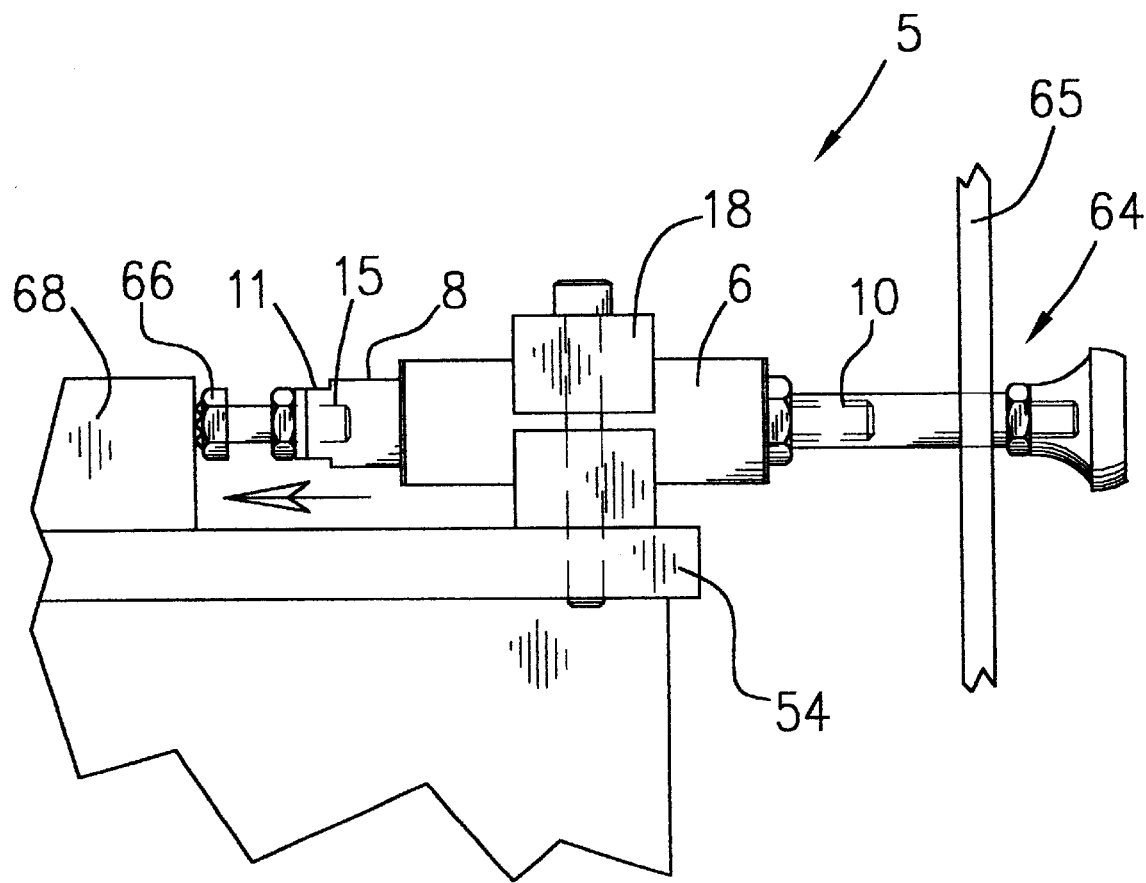
FIG. 16 is a side view of still another embodiment of the present invention.

FIG. 16 shows a standard gripper contact bolt application. In this application the tension end 10 has a remote actuator 64 attached to it. The actuator 64 is generally concealed by an enclosure 65. Opposite the tension end 10 is the compression end 11 which has a gripper contact bolt 66 engaged in hole 15 as shown. The gripper contact bolt 66 has slightly raised tine members to engage the target member 68 and prevent it from slipping.

Figure 17:
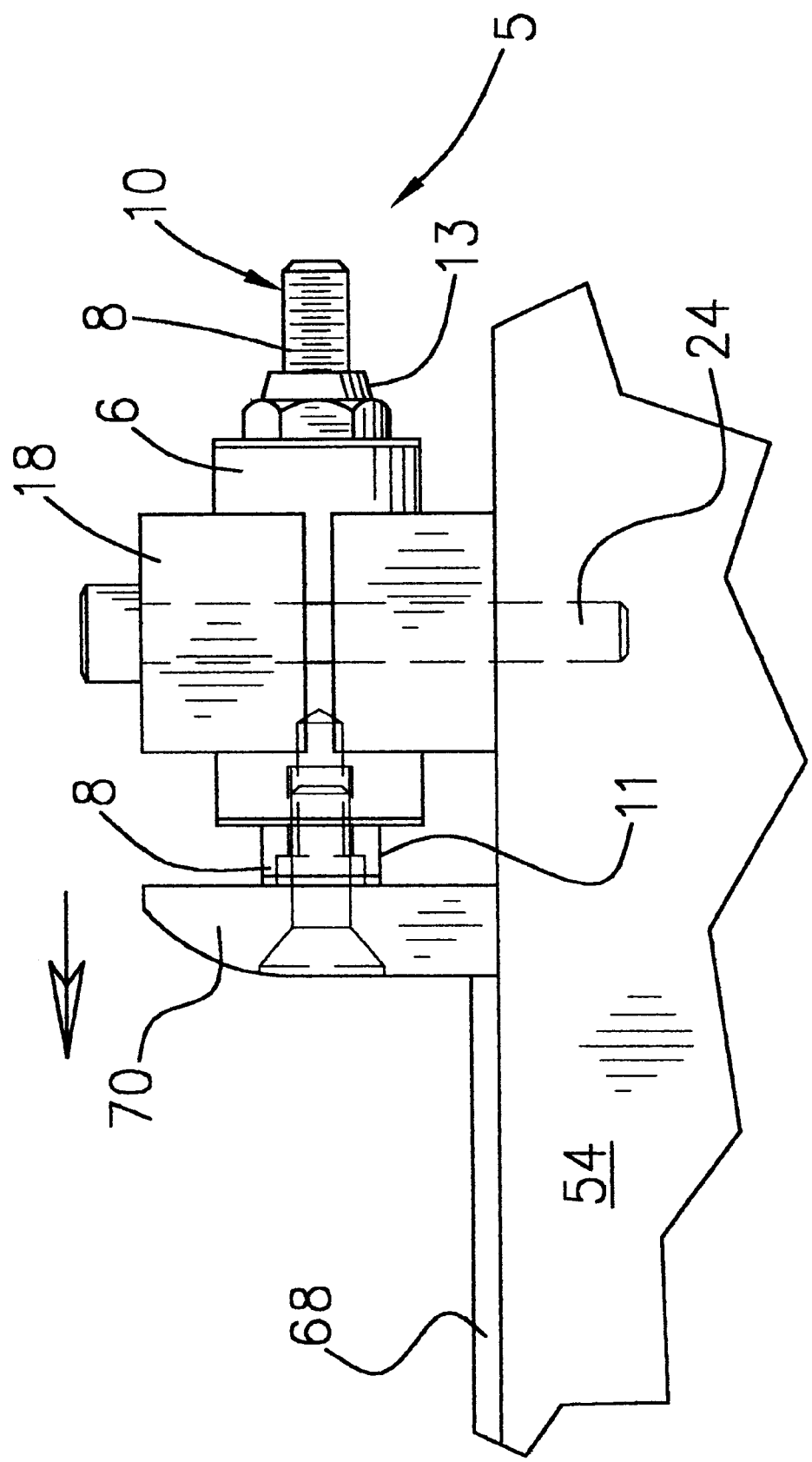
FIG. 17 is a side view of still another embodiment of the present invention.

FIG. 17 shows the device 5 of the present invention in use in a spring stop application. In this embodiment, a flat locating face 70 is attached to the compression end 11 of the plunger 8. The locating face 70 engages the target member 68 as shown. The body is held in place by a clamp 18, which is secured, to mounting member 54 by screws 24. Jam nut 13 threadingly engages the threads of the tension end 10 of the plunger 8.

Figure 18:
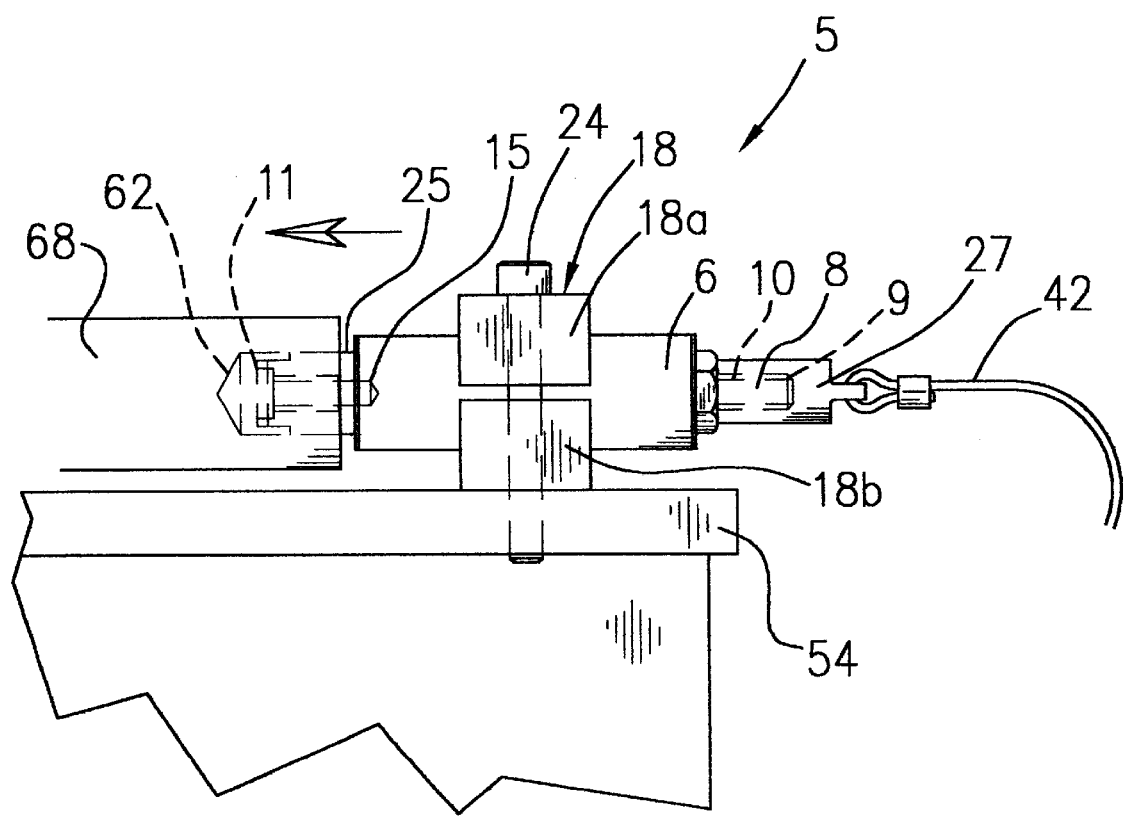
FIG. 18 is a side view of still another embodiment of the present invention.

FIG. 18 shows a remotely actuated cable application of the device 5 of the present invention. In this embodiment a cable 42 is attached to second attachment 27. Second attachment 27 is threadingly engaged to the threads 9 from the tension end 10 of the plunger 8. The compression end 11 is received in a receiving cavity 62 of the target member 68. Body 6 is held in place by a first portion 18a and a second portion 18b of a clamp 18. At least one screw 24 is received in the first portion 18a and in the second portion 18b to engage mounting member 54.

Figure 19:
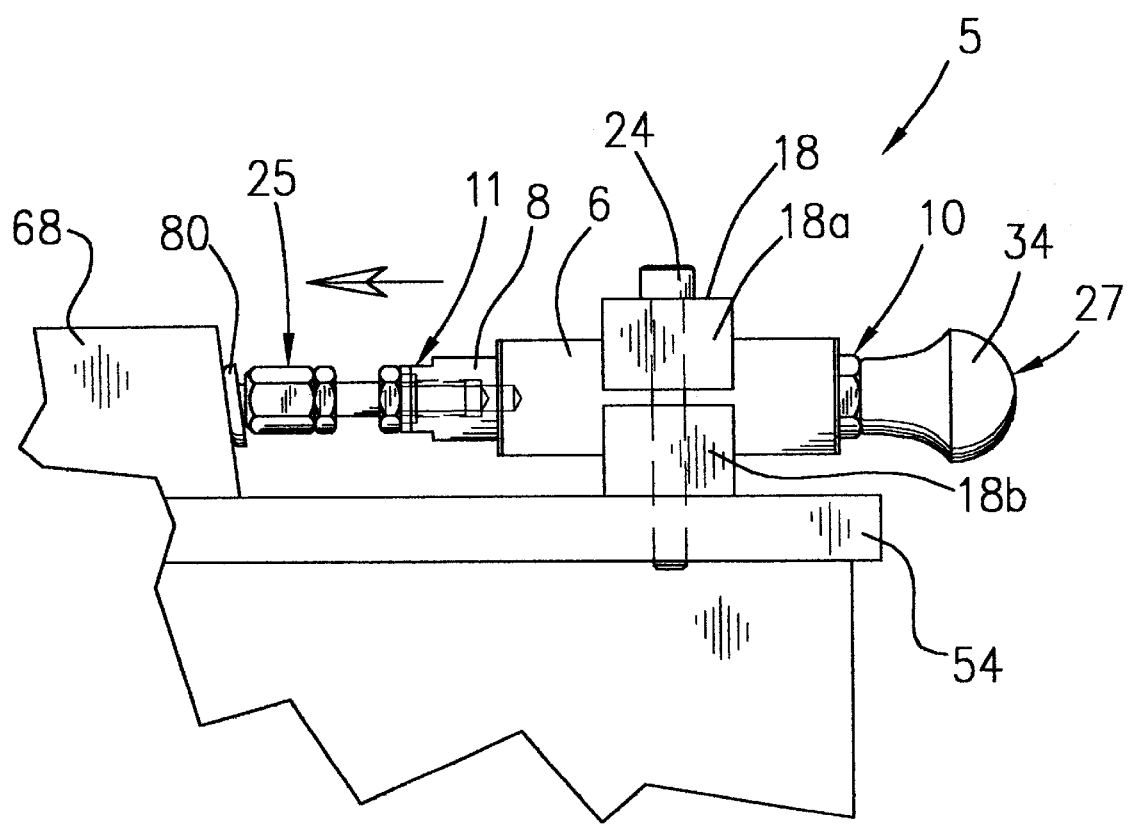
FIG. 19 is a side view of another embodiment of the present invention.

FIG. 19 shows the device 5 of the present invention being used in a standard swivel pad application. In this embodiment the tension end 10 is engaged by a second attachment 27. Second attachment 27 is a knob 34 with a rounded head. Opposite the tension end 10 is the compression end 11 which has a first attachment 25 attached thereto. The attachment 25 has a swivel pad 80 at its outer most end. The swivel pad 80 engages workpiece or target member 68. In this embodiment the body 6 of the device 5 is attached to mounting member 54 by clamp 18 having a first portion 18a, a second portion 18b and a screw 24 received therethrough.

Figure 20:
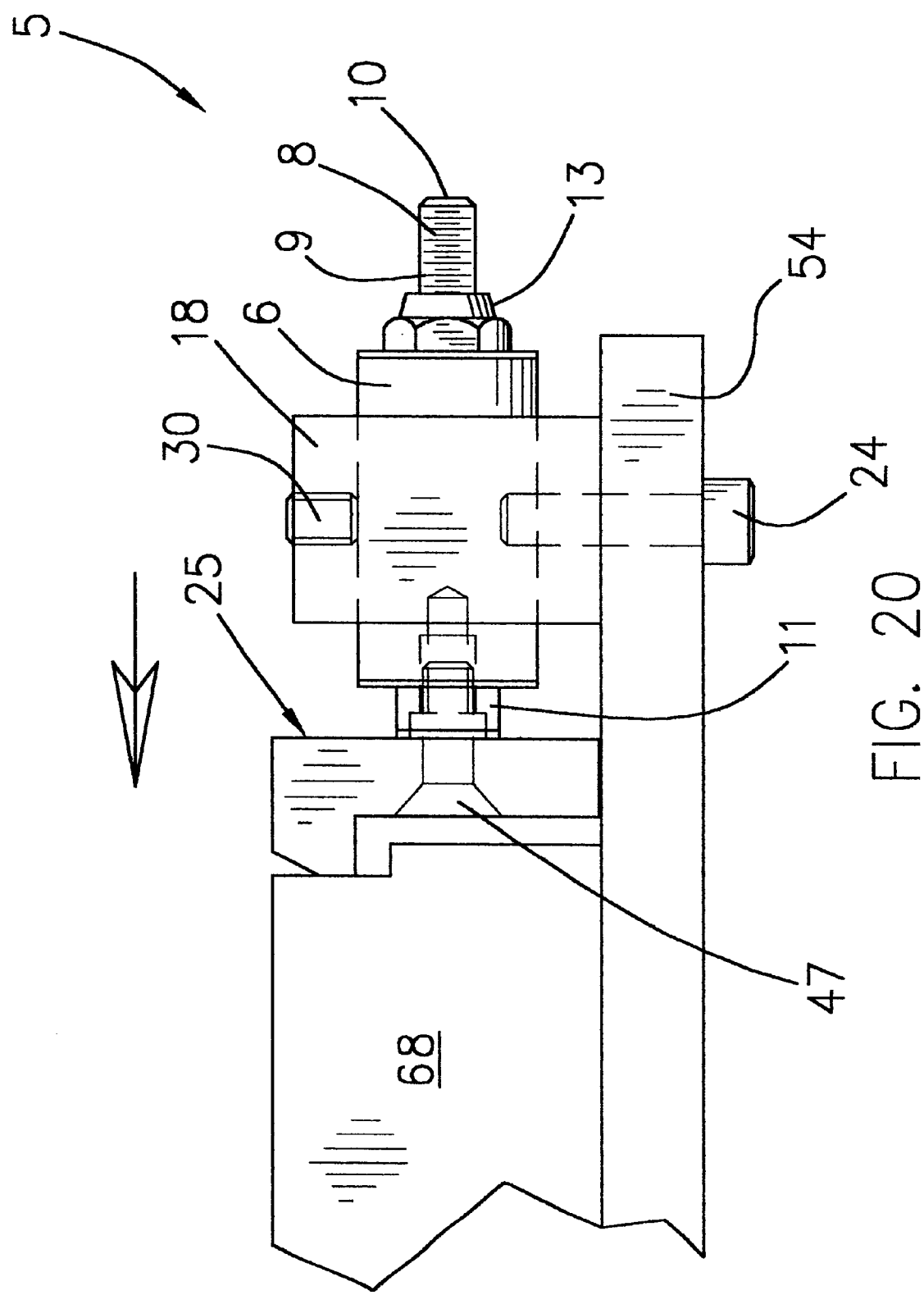
FIG. 20 is a side view of still another embodiment of the present invention.

FIG. 20 shows another application of the device 5 of the present invention. In this embodiment compression end 11 receives an L-shaped or other irregular-shaped first attachment 25. The attachment 25 is held in place by a flathead screw 47. The L-shaped first attachment 25 engages target member 68. In this embodiment body 6 of the device 5 is held in place with a clamp 18 secured to a mounting member 54 by a screw 24. A set screw 30 provides a compression force to the body 6 to prevent the body from moving within the clamp 18. A jam nut 13 is threadingly engaged to threads 9 of the plunger 8 at the tension end 10.

Figure 21:
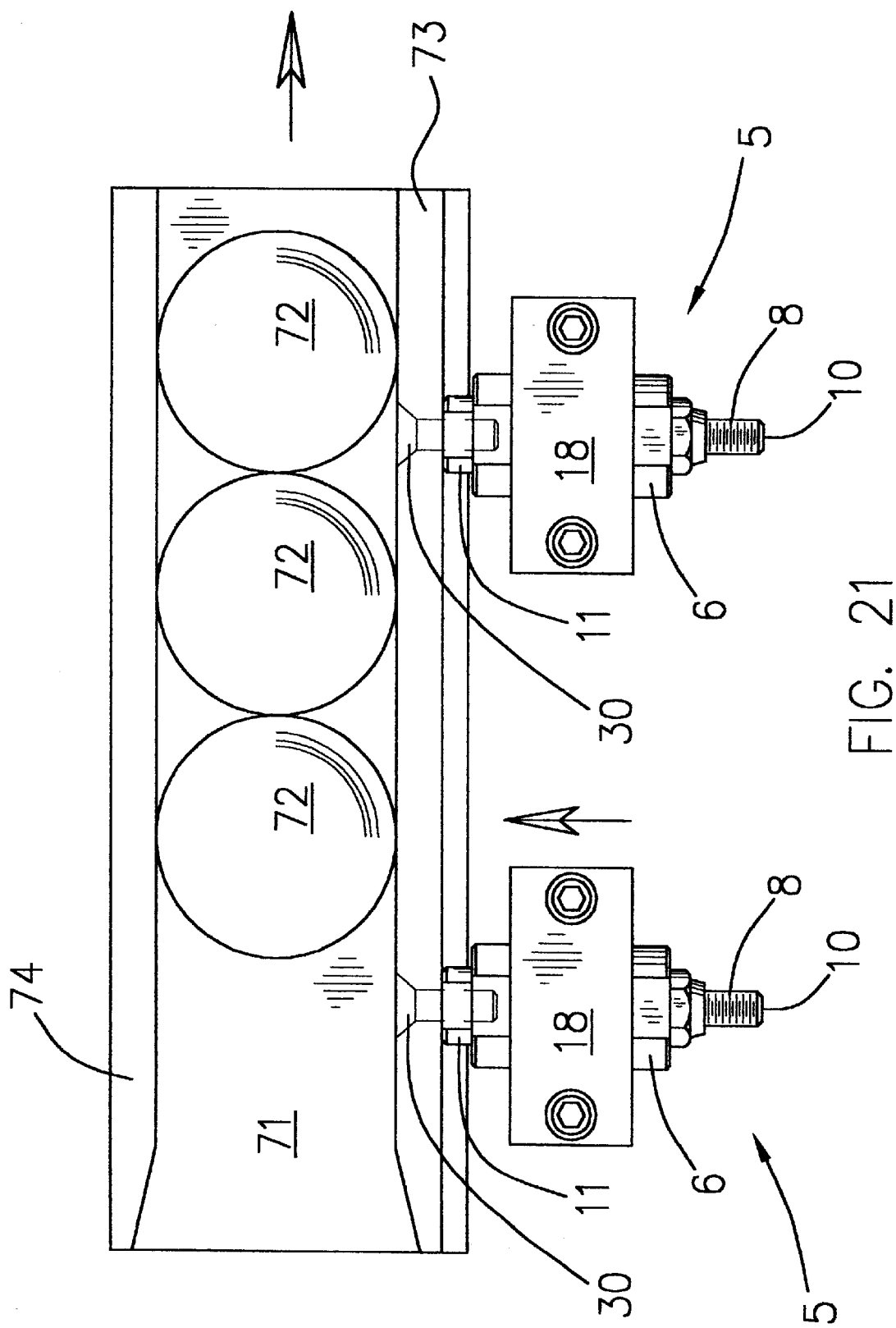
FIG. 21 is a top view of another embodiment of the present invention.

FIG. 21 shows multiple devices 5 being used in a spring loaded guide rail application. In this embodiment a body 6 is secured by a clamp 18 as shown. Attached at compression end 11 by a screw 30 is a spring loaded guide rail 73. The spring loaded guide rail 73 applies force to workpieces 72, which are contained in track 71. As the spring loaded guide rail 71 applies force to the workpieces 72, they in turn are pushed up against stationary guide rail 74.

Figure 22:
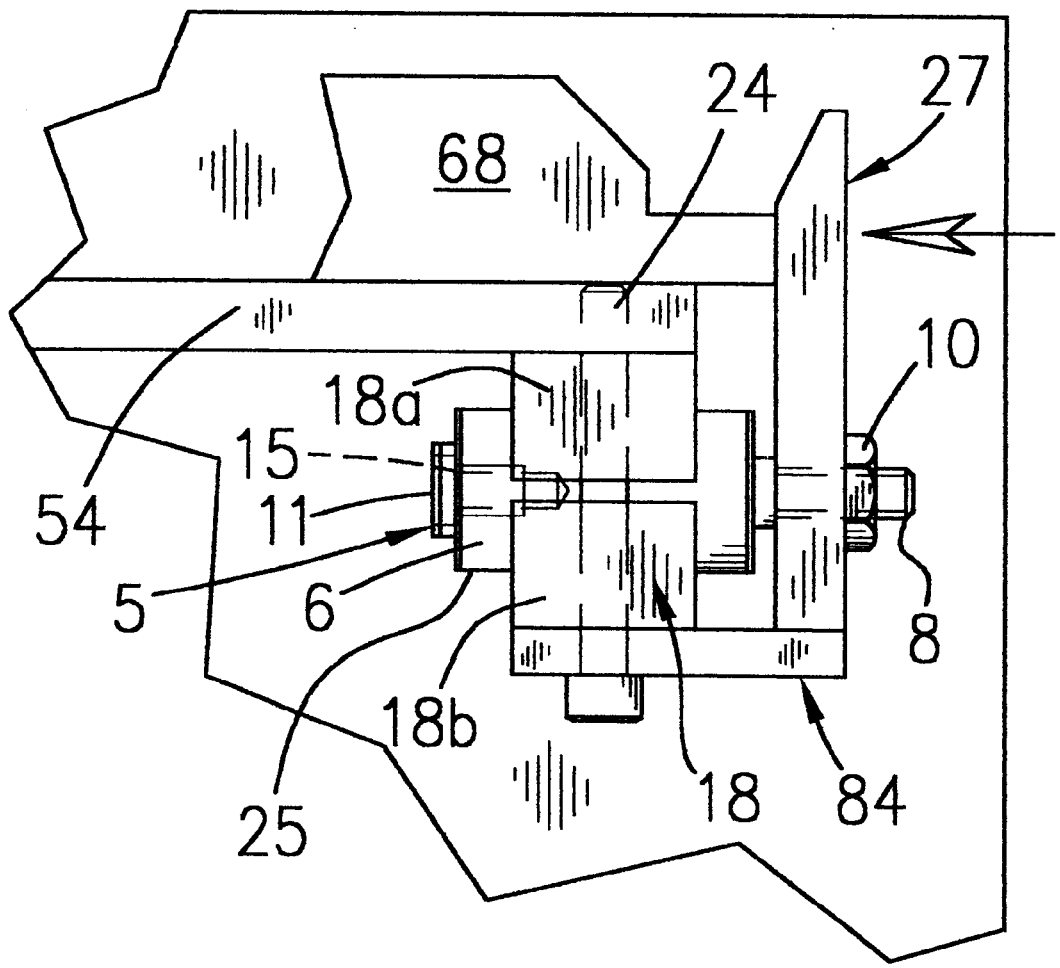
FIG. 22 is a side view of another embodiment of the present invention.

FIG. 22 shows the device 5 of the present invention being used in a tension application. The device 5 in this embodiment is mounted under the mounting member 54. In this embodiment second attachment 27 is attached to tension end 10. Attachment 27 frictionally engages target member 68 as shown. A clamp 18 having a first portion 18a and a second portion 18b secures the body to mounting member 54 a screw 24 is received by an anti-rotate plate 84 which in turn is attached to the clamp 18 by the screw 24.

Figure 23:
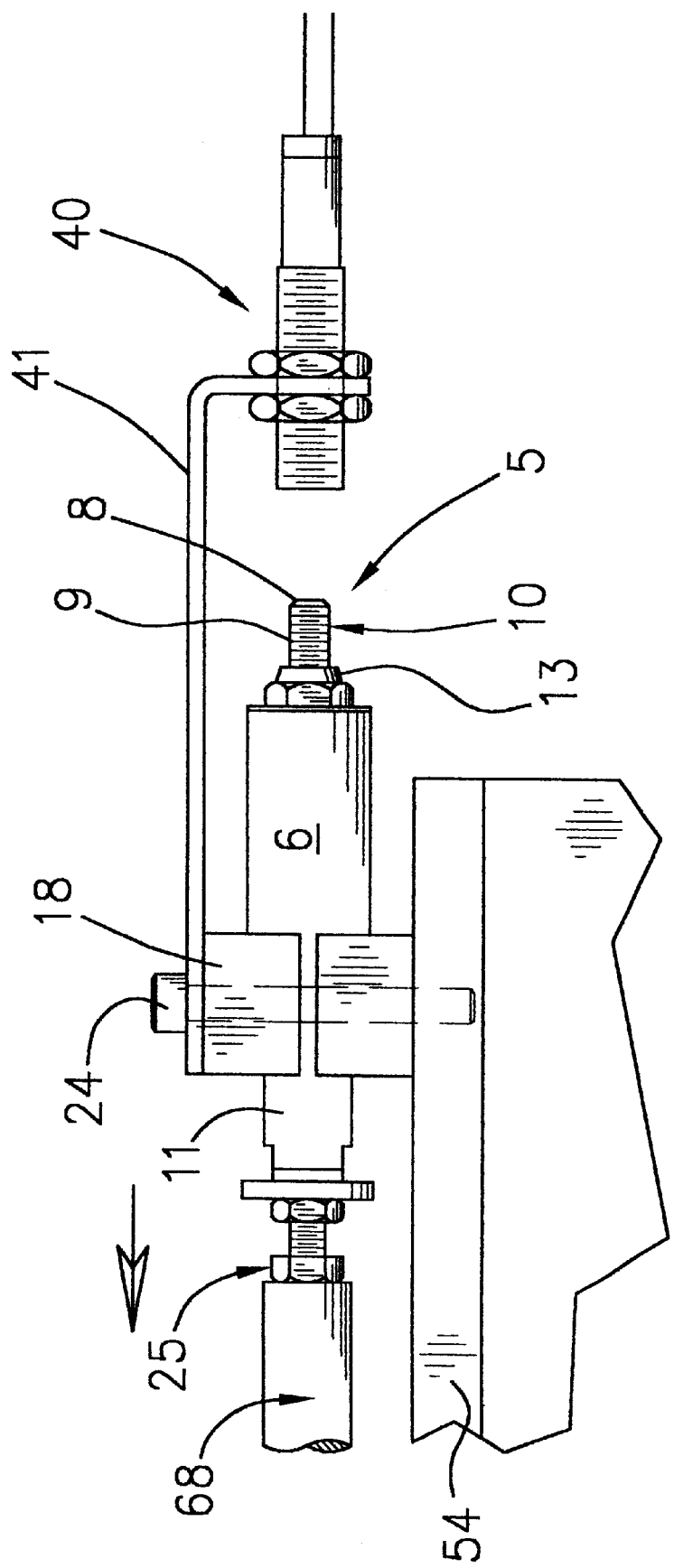
FIG. 23 is a side view of still another embodiment of the present invention.

In FIG. 23, device 5 of the present invention is shown being used in a stop block sensor application. First attachment 25 is engaged to the plunger 8 at compression end 11 as shown. At the other end, a jam nut 13 is attached to threaded extension 9 of the tension end 10. A body 6 of the device 5 is secure to the mounting member 54 by a clamp 18. A screw 24 is received in holes in the clamp 18 and the mounting member 54. Also attached by the screw is a bracket 41, which is attached to clamp 18. The bracket 41 supports a sensor 40 to determine the movement of the plunger 8 and sense the position of the workpiece 68.

Figure 24:
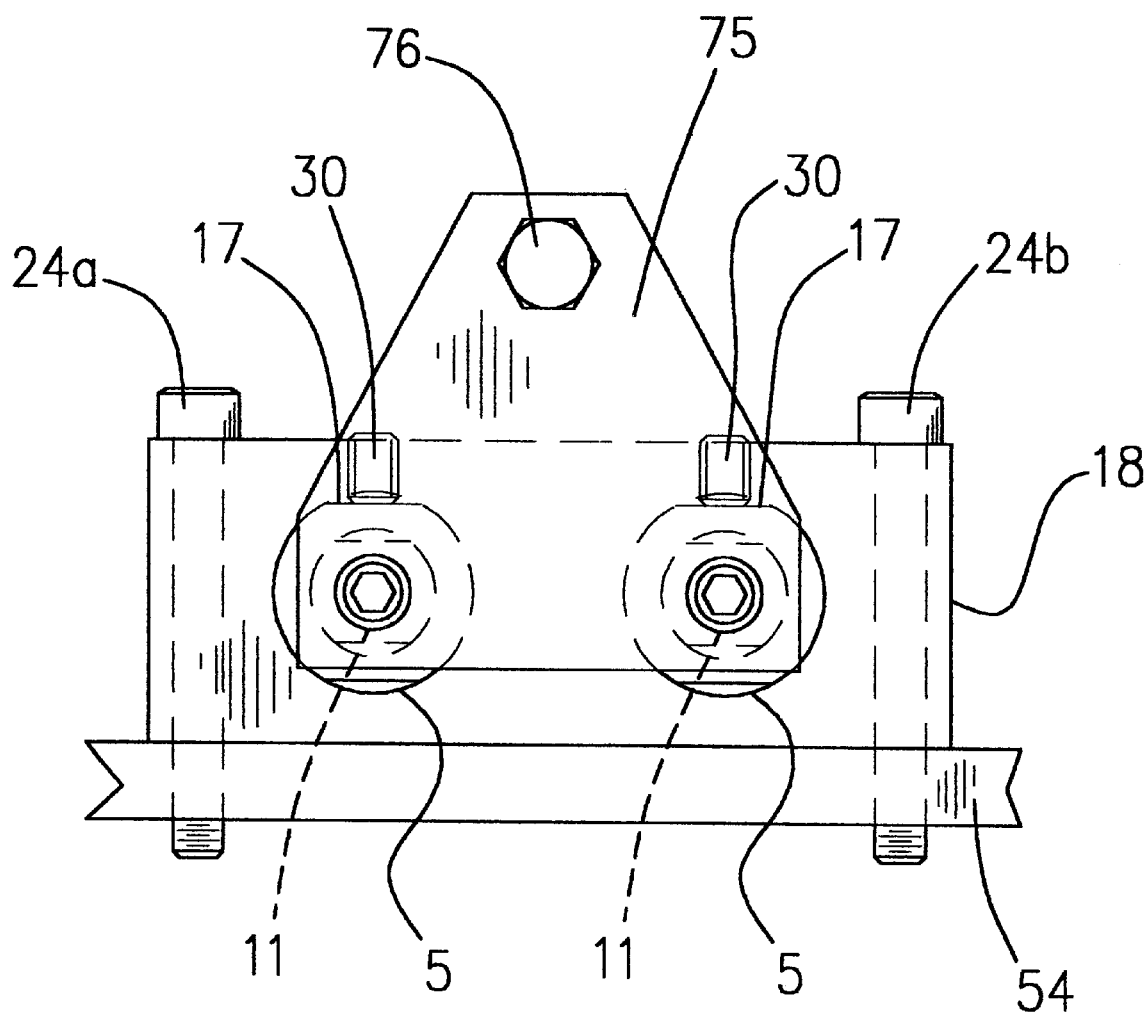
FIG. 24 is a front view of still another embodiment of the present invention.

FIG. 24 shows two devices 5 of the present invention in an offset loading/clamping application. The devices 5 are held in place by a clamp 18, which is connected, to a mounting member 54 by screws 24a and 24b. The devices 5 are secured because setscrews 30 engage the flats 17. Attached to the compression ends 11 of the devices 5 is a triangular plate 75 upon which is mounted a contact bolt 76.

The inventive tool 5 may come in various sizes. For example, there may be at least 4 short-stroke sizes and 4 long-strokes sizes as best-illustrated in Table 1 below. The long-stroke spring tools are preferably made with light or heavy springs. The short-stroke spring tools may closely approximate conventional spring stops in size and spring rate. In addition, there may also be at least one larger short-stroke tool.

TABLE 1

| | | | PLUNGER DIA. | | | | | | | | |
|---|---|---|---|---|---|---|---|---|---|---|---|
| | | 5/16" | | | 1/2" | | | 5/8" | | | 1" |
| | | | | | STROKE | | | | | | |
| SPRING | | 1/8" | 3/8" | | 3/16" | 9/16" | | 1/4" | 3/4" | | 3/8" | 1 1/8" |
| FORCE | | | LT. | HVY. | | LT. | HVY. | | LT. | HVY. | | LT. | HVY. |
| END | INITIAL | 4.75 | 0.5 | 1.5 | 8.5 | 2 | 5.5 | 14 | 2 | 6 | 35.5 | 2.5 | 6.5 |
| FORCE | HALFWAY | 9.75 | 1.5 | 4 | 21.75 | 3.5 | 10 | 28 | 5.5 | 15 | 53.5 | 8 | 21 |
| (LBS.) | FINAL | 14.5 | 2.25 | 6.5 | 34.75 | 5 | 14 | 42 | 8.75 | 24 | 71.25 | 13.75 | 35.75 |

The spring-biased device 5 is preferably constructed of steel, although various components may be made from a multitude of materials including aluminum, stainless steel, plastics, etc. A black oxide finish preferably is applied to improve corrosion resistant. However, other treatments to add corrosion resistance are contemplated.

There are virtually enumerable uses for the present invention, all of which need not be detailed here. For example, the machine tool 5 may be used on any machine application including: assembly lines, production machinery, material handling, deburring machines, grinding machines, welding machines, fixturing applications, bottling and canning operations, CNC machines, drill presses, etc. Moreover, all of the disclosed embodiments can be practiced without undue experimentation.

Although the best mode contemplated by the inventors of carrying out the present invention is disclosed above, practice of the present invention is not limited thereto. It will be manifest at various additions, modifications, and rearrangements of the features of the present invention may be made without deviating from the spirit and scope of the underlying inventive concept. Moreover, the individual components need not be formed from the disclosed materials, in a disclosed shapes, or assembled in a disclosed configuration, but could be fabricated from virtually any suitable materials, could be provided in virtually any shape, and assembled in virtually any configuration.

Further, although various steps and components are described herein as physically separate modules, it will be manifest that they can be integrated into the steps or apparatus with which they are associated. Furthermore, all of the disclosed features of each disclosed embodiment can be combined with, or substituted for, the disclosed features of every other disclosed embodiment except where such features are mutually exclusive. The terms upper, lower, top, bottom and the like in the specification in claims are intended to assist the reader in understanding the invention and are not intended as terms of limitation.

It is understood that the invention is not limited to the particular embodiments disclosed and illustrated herein but embraces such modified forms thereof as come within the scope of the following claims. It is intended that the appended claims cover all such additions, modifications, and rearrangements. Expedient embodiments of the present invention are differentiated by the appendent subclaims.

I claim:

1. A spring biased device comprising:
   a cylindrical body;
   a cylindrical plunger retained in the body, the plunger having a compression end and a tension end and at least one flat side;
   a jam nut retained on the plunger;
   a spring inside the body;
   an attachment attached to either the compression end or the tension end; and
   wherein the plunger has an axial groove on outer surface to allow air inside to escape.

2. The device of claim 1, wherein the tension end has a threaded extension used for attaching attachments.

3. The device of claim 1, wherein the body has a smooth outside diameter and two flat edges running an entire length of the body.

4. The device of claim 1, wherein the plunger contains a means for smooth actuation.

5. The device of claim 1, further comprising at least one flat provided on the plunger to facilitate attachment of attachments.

6. The device of claim 1, further comprising a split-clamp block for mounting.

7. The device of claim 1, further comprising a retracting lock in cooperation with the plunger.

8. The device of claim 7, wherein the retracting lock attaches to a threaded extension at the tension end.

9. The device of claim 1, wherein the lock is retracted and rotated 90 degrees to lock the plunger in a retracted position.

10. The device of claim 1, wherein the plunger has tapped mounting holes with a pilot hole at the compression end.

11. The device of claim 1, further comprising a lock for preventing rotation of the plunger; and
    tangs for engaging flats of the body.

12. A spring biased device comprising:
    a cylindrical body;
    a cylindrical plunger retained in the body, the plunger having a compression end and a tension end and at least one flat side;
    a jam nut retained on the plunger; a spring inside the body;
    at least one attachment attached to at least one of the compression end and the tension end; and
    further comprising a lock for preventing rotation of the plunger; and
    tangs for engaging flats of the body.

13. The device of claim 12, wherein the body has a smooth outside diameter and two flat edges running a entire length of the body.

14. The device of claim 12, wherein the plunger has an axial groove on outer surface to allow air inside to escape.

15. The device of claim 12, wherein the plunger contains a means for smooth actuation.

16. The device of claim 12, further comprising at least one flat provided on the plunger to facilitate attachment of components.

17. The device of claim 12, wherein the fixture is at least one of the following: welded, bonded or press-fit in place.

18. The device of claim 12, further comprising a split-clamp block for mounting.

19. The device of claim 12, further comprising a retracting lock in cooperation with the plunger.

20. The device of claim 19, wherein the lock is retracted and rotated 90 degrees to lock the plunger in a retracted position.

21. The device of claim 12, wherein the retracting lock attaches to a threaded extension at the tension end.

22. The device of claim 12, wherein the plunger has tapped mounting holes with a pilot hole at the compression end.

23. The device of claim 12, wherein the tension end has a threaded extension used for attaching attachments.

\* \* \* \* \*